United States Patent [19]

Bock et al.

[11] Patent Number: 4,966,034

[45] Date of Patent: Oct. 30, 1990

[54] ON-BOARD TIRE PRESSURE INDICATING SYSTEM PERFORMING TEMPERATURE-COMPENSATED PRESSURE MEASUREMENT, AND PRESSURE MEASUREMENT CIRCUITRY THEREOF

[75] Inventors: Ditmar H. Bock, Hamburg; John M. Grace, Buffalo, both of N.Y.

[73] Assignee: Schrader Automotive, Inc., Nashville, Tenn.

[21] Appl. No.: 330,386

[22] Filed: Mar. 29, 1989

Related U.S. Application Data

[63] Continuation-in-part of Ser. No. 187,129, Apr. 28, 1988, abandoned.

[51] Int. Cl.[5] .................... B60C 23/02; G01L 7/08; G01L 9/04; G01L 23/04
[52] U.S. Cl. ............................... 73/146.5; 73/708; 73/727
[58] Field of Search .............. 73/146.5, 146.4, 146.8, 73/708, 727; 340/448

[56] References Cited

U.S. PATENT DOCUMENTS

| | | | |
|---|---|---|---|
| 4,467,641 | 8/1984 | Abraham | 73/146.5 |
| 4,567,459 | 1/1986 | Folger et al. | 73/146.5 |
| 4,703,650 | 11/1987 | Dosjoub et al. | 73/146.5 |
| 4,737,761 | 4/1988 | Dosjoub et al. | 73/146.5 |
| 4,749,993 | 6/1988 | Szabo et al. | 73/146.5 |

FOREIGN PATENT DOCUMENTS

| | | |
|---|---|---|
| WO87/127 | 1/1987 | PCT Int'l Appl. |
| 1301359 | 12/1972 | United Kingdom ............... 73/146.5 |
| 2122757 | 1/1984 | United Kingdom ............... 73/146.5 |

OTHER PUBLICATIONS

Huijsing et al, Journal of Solid-State Circuitry SC-22, No. 3, 6-1987 pp. 343-349.

Primary Examiner—Donald O. Woodiel
Attorney, Agent, or Firm—Sughrue, Mion, Zinn, Macpeak & Seas

[57] ABSTRACT

A reliable indication of temperature-compensated pressure is provided from each of the wheels of a vehicle to an operator within the vehicle. A piezoresistive transducer bridge is supplied by a constant current source in one embodiment, and by a voltage of constant amplitude in another embodiment. Voltage to the bridge is reversed on a periodic basis. The use of constant current enables compensation for temperature-induced drift in transducer bridge output. The use of constant voltage enables compensation for ambient temperature, and provides an absolute, rather than a relative indication of pressure or "flatness" within the tire. Voltage polarity reversal permits compensation of amplifier offset voltage. Energy is transmitted to an from the wheel by means of a tuned circuit which is excited by a primary coil when the vehicle's engine is running. The secondary coil mounted on the wheel may be either short-circuited or selectively opened and closed to alter the operation of the primary coil, thus providing an indication of tire pressure, that indication being detected and processed by suitable microcomputer circuitry which may exist on board the vehicle. Most of the active circuit elements of the invention may be implemented in a single monolithic integrated circuit, which can be attached to a tire valve.

25 Claims, 6 Drawing Sheets

ON-BOARD TIRE PRESSURE INDICATING SYSTEM PERFORMING TEMPERATURE-COMPENSATED PRESSURE MEASUREMENT, AND PRESSURE MEASUREMENT CIRCUITRY THEREOF

This is a continuation of application Ser. No. 187,129 filed Apr. 28, 1988 now abandoned.

BACKGROUND OF THE INVENTION

The present invention relates to a system for monitoring the pressure of tires of a vehicle, and for communication of pressure information to an operator within the vehicle. The system employs a tire pressure sensor, mounted inside a rim of each wheel of the vehicle, which alters tire pressure values in accordance with changes in temperature. Circuitry, mounted on the chassis in proximity to the wheel, receives temperature-compensated pressure information which is transmitted inductively from the wheel. Processing and display circuitry may perform one of two functions. The circuitry may enable the operator to consult the system selectively for active monitoring of tire pressure. Alternatively, the circuitry may require no operator action, in which case the system would output an alarm, such as a warning light or other indication, when pressure falls below an acceptable level.

According to the invention, circuitry is provided in associated with a piezoresistive pressure transducer to provide accurate. efficient, and reliable adjustment of detected pressure values to account for changes in temperature during vehicle operation. These and other features of the invention will be described below.

Various kinds of tire pressure sensor systems which provide automatic indication of tire pressure are Well known. Some devices, such as that disclosed in U.S Pat. No. 4,040,380, include small indicators, connected to a tire valve, Which pop up When tire pressure falls below a predetermined value. Other types of tire-mounted indications, as shown in U.S. Pat. Nos. 3,717,030 and 4,723,445, provide a visual display on the wheel itself.

The just-mentioned devices are mounted only on wheels of vehicles, and do not need associated circuitry mounted anywhere else on the vehicle to provide visual indication of tire pressure. However, in order for such devices to be useful, it is necessary to inspect the tires visually, so that the vehicle would have to be stopped, and a driver would have to get out of his or her car.

Other approaches to tire pressure sensing are known which provide pressure information to a driver within the vehicle. In order to provide such a remote indication, the circuitry or other structure mounted on the rim of the tire must somehow communicate with some other circuitry elsewhere within the vehicle, so that the information may be transmitted to the driver within the vehicle. Different approaches have been tried. One such approach employs a radio transmitter with a self-contained independent power supply within the rim, with a receiver mounted close to the tire on the chassis of the car. The received information is transmitted to the vehicle console, which contains some sort of indicator to tell the driver when tire pressure is unacceptable. Examples of this approach are found in U.S. Pat. Nos. 4,443,785, 4,384,482 and 4,048,614. Of course, a self-contained independent power supply, such as a battery can become drained, so that the remote device can become inoperative.

Other approaches, such as that shown in U.S. Pat. Nos. 3,938,077, 3,911,434, 3,723,966, 3,694,803 and 3,092,806 employ a very well known technique of tuned circuit alteration. In this approach, a primary coil is mounted on a vehicle chassis, and transmits energy at a frequency in the radio range, for example, 175 kHz. A secondary coil, mounted on the rim of the wheel, is excited by the transmission of the primary coil. In this manner, energy is transmitted to the secondary coil for operation of the sensing equipment in the wheel. Responsive to an indication of tire pressure a capacitor may be mounted across the ends of the secondary coil and periodically short circuit the coil. The short circuiting of the secondary coil affects the operation of the primary coil, and the effect in operation may be translated into an indication of tire pressure within the vehicle itself.

Remote tire pressure sensors which transmit and receive energy between the vehicle and the wheel may do so in a periodic manner, or in a continuous manner. The difference depends primarily on the structure of the rim-mounted antenna or transmitter circuitry. One approach disclosed in U.S. Pat. No. 3,786,413 operates only when the vehicle is in motion. Where the circuitry is located at a single place on the rim, the circuitry can make contact with chassis-mounted circuitry only once per revolution of the wheel. However, if an oscillator antenna were looped around the rim, a chassis-mounted primary coil could be in continuous contact with the secondary coil on the rim. Most of the just-mentioned U.S. patents, including U.S. Pat. Nos. 3,723,966 and 3,092,806, provide examples of this. Other examples are found in the following U.S. Pat. Nos. 4,609,905; 4,567,460; 4,562,874; 4,554,528; 4,529,961; 4,510,484; 4,450,431; 4,409,586; 4,389,884; 4,363,020; 4,348,654; 4,130,817; 4,064,482; 4,057,783; 4,020,456; 4,017,826; 4,006,449; 3,990,041; 3,950,726; 3,930,224; 3,922,639; 3,913,065; 3,858,174; and 3,806,905.

One problem that arises during operation of tire pressure sensors of any kind is that tires heat up as they are run for longer periods of time. When a tire heats up, air expands within the closed volume of the tire, thus causing increased pressure within the tire, though the overall amount of air within the tire remains the same. Since the pressure nominally is different, a tire pressure sensor can provide different pressure readings when a tire is hot than would be the case if the tire were cold. This is why tire and vehicle manufacturers recommend that owners check their tire pressure when the tire is cold. Of course, with a remote tire pressure sensor, an operator may receive a continuous indication of tire pressure within the vehicle, but the indication may be inaccurate because of the temperature change. Thus, it is necessary to compensate for changes in temperature.

There are known approaches to compensating for temperature changes within a tire. One example of a device providing a temperature-compensated pressure indication is shown in PCT Published Patent Application No. W087/00127, published Jan. 15, 1987, having as an equivalent U.S. Pat. No. 4,703,650. In this device, a piezoresistive transducer has a continuous voltage applied thereto, and provides a pressure indication which, while compensating to some extent for temperature changes nonetheless incorporates some temperature drift which is inherent in the transducer itself. To compensate for this drift, a thermistor is provided to correct the indications given by the transducer. The corrected signal indications are provided in digital form as a pulsed output. It is possible to derive indications of both temperature and pressure from the coded signal output.

The just-mentioned U.S. patent provides separate indications of temperature and pressure as a single coded signal. U.K. Published Patent Application No. 2112757 provides a similar indication, to enable readout of separate temperature and pressure indications for each tire. Great Britain Published Patent Application No. 1301359 also provides such separate indications.

It also is known to compensate for ambient temperature outside the tire, as evidenced for example by U.S. Pat. No. 4,567,459. This additional compensation can have an effect on the pressure reading obtained, since changes in temperature outside the tire, as well as those inside the tire, affect the amount of "flexing ∞ of a tire, and thus affect the volume within a tire.

There is another PCT Published Patent Application, No. W087/00129, having as an equivalent U.S. Pat. No. 4,737,761, which discloses a transmission means employing inductive coupling, for controlling transmission and reception of the coded signal output by the device in U.S. Pat. No. 4,703,650.

Other known devices also provide temperature compensation. Examples of such devices are disclosed in U.S. Pat. Nos. 4,310,220, 4,052,696, and 4,465,075 teaches an on-chip pressure transducer which also employs thermistors to compensate for temperature drift. The above-mentioned U.S. Pat. No. 4,723,445 also addresses the issue of the need for temperature compensation.

While the first-mentioned PCT application, as well as the other temperature-compensation approaches, disclose useful ways of providing temperature-compensated pressure indications, these systems contain some inherent inaccuracy in measurement, and inefficiency in transmission, which the present invention corrects.

SUMMARY OF THE INVENTION

In view of the foregoing, it is one object of the present invention to provide a system which enables efficient transmission of reliable, accurate, temperature-compensated pressure indications to an operator within a vehicle.

It is a further object of the invention to provide this system with substantially all of the active circuitry associated with the wheel of the vehicle contained in a small integrated circuit chip which may be attached to a tire valve.

It is still a further object of the invention to store a time sequence of temperature-compensated pressure indications as a form of pressure history, to provide information to a vehicle operator regarding change in condition of vehicle tires over time. This information would also be useful, for example, to a mechanic or other individual servicing the tire.

Yet another object of the present invention is to provide reliable temperature-compensated pressure indications for all of the wheels of the vehicle, including a spare tire, at a central location within the vehicle.

One more object of the present invention is to take advantage of already-existing microcomputer circuitry which currently is available in a wide range of vehicles, particularly those at the upper end of the price spectrum, to process information received from wheel-mounted circuitry.

The foregoing and other objects of the invention are achieved in the disclosed and claimed on-board tire pressure measurement system, which includes wheel-mounted circuitry and chassis-mounted circuitry. The wheel-mounted circuitry includes a piezoresistive transducer; a source of constant current which, according to one embodiment of the invention, is applied to the transducer directly and which, according to another embodiment, is replaced by a constant voltage which in turn is applied to the transducer; and a voltage source whose polarity is reversed periodically.

At present, the contemplated best mode of implementation of the wheel-mounted circuitry is in a monolithic integrated circuit. The chassis-mounted circuitry includes a primary coil as an energy source for transmitting energy to wheel-mounted circuitry, and circuitry, preferably in the form of a suitably programmed microprocessor, for processing pressure information from the wheel-mounted circuitry to the chassis-mounted circuitry.

BRIEF DESCRIPTION OF THE DRAWINGS

The drawings, which will be described below, depict various circuit implementations of the invention, including several different ways of communicating temperature-compensated pressure information from the wheel to the chassis. In the drawings.

DETAILED DESCRIPTION OF THE PREFERRED EMBODIMENTS

Figure 1A:
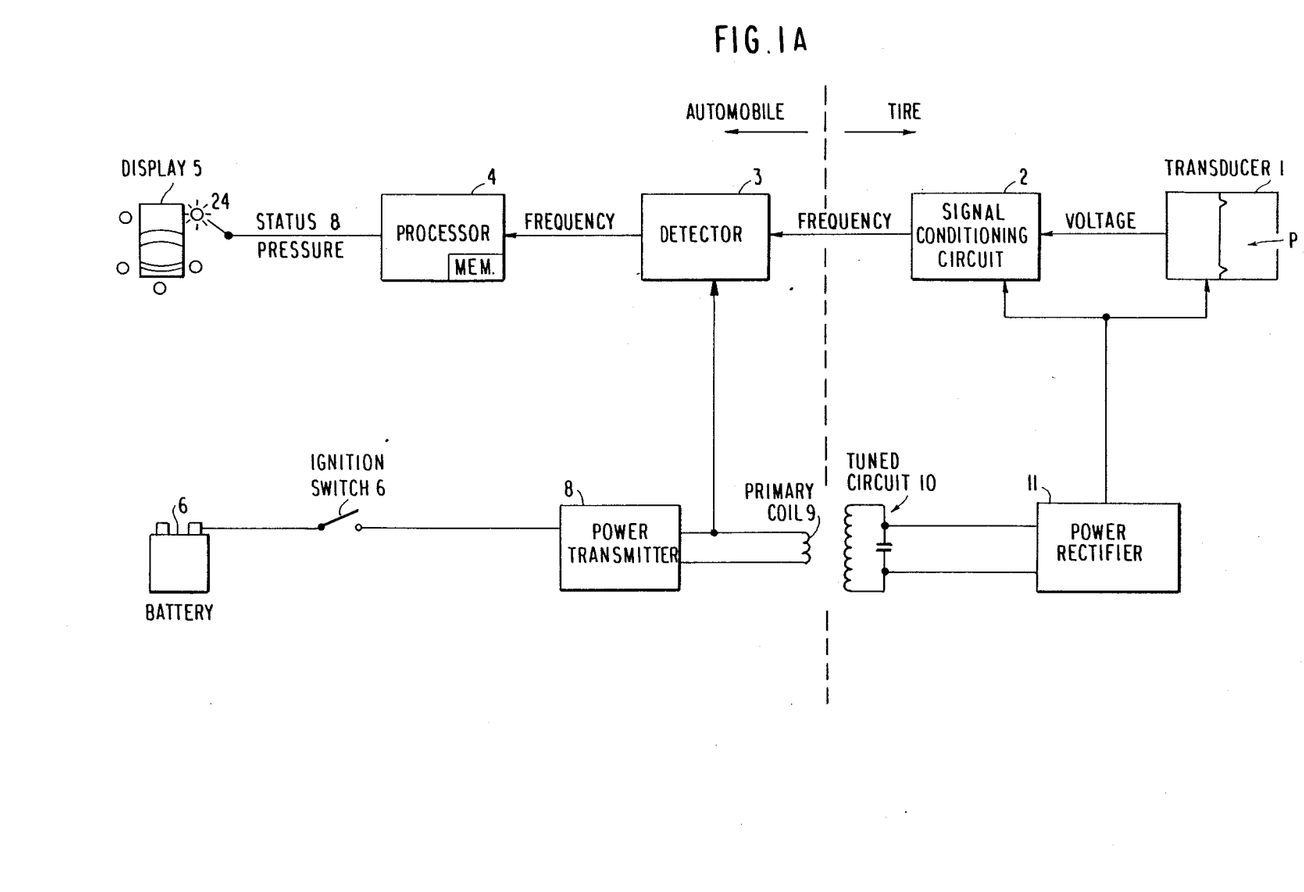
FIG. 1A is a block diagram providing an overview of the present invention.

Referring to FIG. 1A. an artificial "interface" is drawn in a dotted line, with the vehicle-mounted portion of the invention shown on the left side of the Figure and the tire or rimmounted portion shown on the right side of the Figure. It should be noted that all of the Figures in the application, as well as the accompanying description, apply to each tire, including any spare tire, in the vehicle.

Stating at the lower left-hand corner of FIG. 1A and working counterclockwise, when the vehicle engine is turned off, the circuitry of the invention is not operational. However, when the vehicle is operated, and the ignition switch 7 is closed, power flows from the battery or generator 6 to a power transmitter which generates an alternating current (AC) magnetic field. In the preferred embodiment, the field is generated at 175 kHz.

Figure 1B:
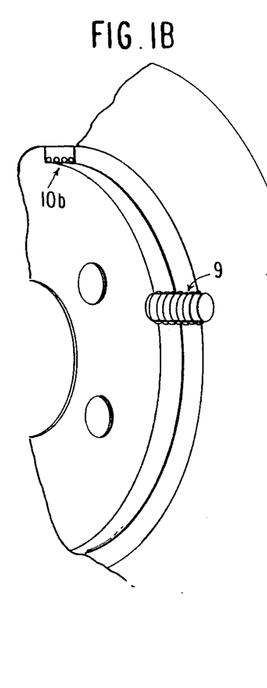
FIG. 1B is a sketch of mounting of the power receiving circuitry around a wheel of a vehicle.

A primary coil 9 transmits this 175 kHz frequency to a tuned circuit 10 which is mounted on the rim of the tire. The tuned circuit 10 has a secondary coil, and capacitor connected across the ends of the secondary coil. The primary and secondary coils are connected generally as shown in FIG. 1B. The second coil is wound into a U-shaped channel in the wheel. The U-shaped channel is cemented inside the wheel rim. The primary coil is attached to a bracket on an associated brake assembly on the vehicle frame. When power is applied from the vehicle battery to the primary coil, the primary and secondary coils are inductively coupled to each other.

The circuit 10 is connected to a power rectifier 11 which receives energy from the tuned circuit 10 and provides power to the transducer 1 and signal conditioning circuit 2, which are described in greater detail below.

The transducer 1 is mounted within the wheel, and includes a piezoresistive sensor, which will be discussed below. The transducer closes off the remaining open end of a chamber which is pressurized to a predetermined pressure, and exerts force in a first direction. The other side of the transducer is exposed to air within the tire, and undergoes a force in a second, opposite direction, the degree of force depending on air pressure within the tire. The output of the transducer is a function of the differential force exerted on opposing sides of the transducer. One example of such a transducer is produced by IC Sensors of Milpitas, Calif.

The output of the transducer 1 is provided as a voltage to the signal conditioning circuit 2, which then imposes a frequency of a few kHz which is modulated onto the tuned circuit 10. A detector 3 connected to the primary coil 9 detects variations in primary power consumption induced by this few kHz frequency. The detector output then is amplified and is separated from the signals at 175 kHz (the power transfer frequency) by filtering. A processor 4 receives the separated detector output, and provides a count which is translated within the processor 4 into an indication of pressure. The pressure information is output on a display 5 mounted within the vehicle. As is shown in FIG. 1A, there are five possible lights which are shown in the display 5, one for each wheel including the spare tire.

The foregoing description was provided for the case in which only a single primary coil and a single secondary coil are used. However, more than one of each may be used. For example, one primary/secondary coil pair may be used to transmit energy to the wheel-mounted circuitry, and another such pair may be used to transmit pressure information to chassis-mounted circuitry.

Figure 2A:
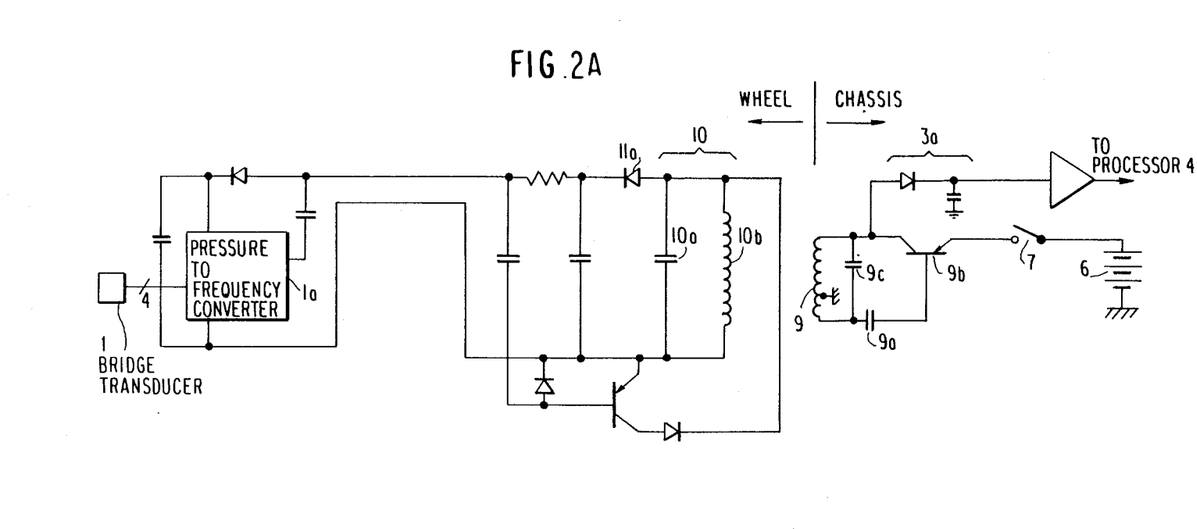
FIG. 2A is a more detailed diagram showing some of the circuitry of the invention, and providing more detailed operational flow information.
Figure 2B:
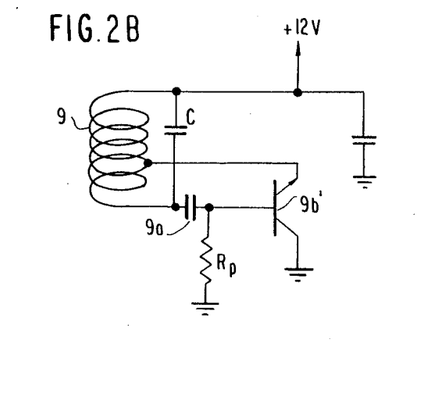
FIG. 2B is a circuit diagram for explaining the operation of the power transmission circuitry of the invention.

In FIGS. 2A and 2B, greater detail is provided, to show that the detector 3 and processor 4 both are connected to the primary coil 9. A capacitor 9a and PNP transistor 9b function as an inductive oscillator. The PNP transistor 9b normally is in a conductive state, and allows power to flow from the power source 6 to the primary coil 9. However, when the capacitor 9a discharges and powers the base of the transistor 9b, this flow is prevented. The coil 9 and capacitor C are selected appropriately to provide the 175 kHz frequency.

Another embodiment of the inductive oscillator circuitry is shown in FIG. 2B. according to which the primary coil 9 transmits energy generally in the following manner. When power is switched on, resistor $R_P$ causes base current to flow in NPN transistor 9b. In response thereto, a larger emitter current flows into the tap on the tuned circuit comprising the coil 9 and the capacitor C, intiating a voltage swing that is stepped up by auto transformer action and is added, via the capacitor 9a, to the voltage on the base, which falls until it passes zero. At this point, the collector-base junction is reverse biased, and current flow ceases. The lower terminal of the tuned circuit now swings positive to about +24V, with the transistor 9b, not conducting because the base is turned off via the capacitor 9a. During the negative return swing of the tuned circuit, the resistor $R_P$ can charge the capacitor C sufficiently to make the base conductive, so that the cycle continues. This circuit is referred to as a Harley oscillator.

Looking again at FIG. 2A, the secondary coil 10b and the tuning capacitor 10a form the tuned circuit 10.

The diode 11a and associated resistors and capacitors provide the function of the power rectifier 11 of FIG. 1A, in a known manner. The excitation of the secondary coil 10b by the primary coil 9 causes energy to be transmitted to the transducer 1, which as described above provides an output which is a function of tire pressure. The transducer output is provided to a pressure-to-frequency converter 1a. One example of a pressure-to-frequency converter is shown in an article by Huijsing et al., in a June, 1987 article in the *IEEE Journal of Solid-State Circuits*, Volume SC-22, No. 3, pages 343-349. This pressure-to-frequency converter converts the transducer output to a frequency value, which is output back across the secondary coil 10b, and affects the output of the primary coil 9.

Detector circuitry 3a detects the altered output at the primary coil 9, and provides an output accordingly to the processor 4.

Figure 3:
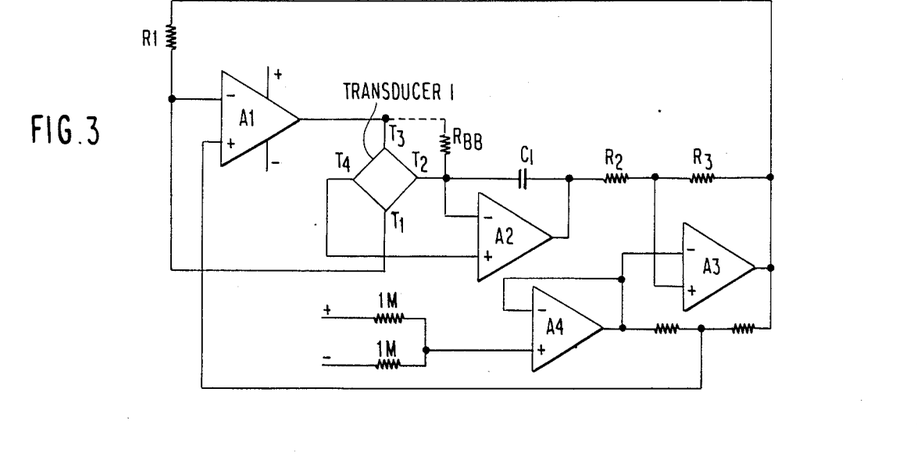
FIG. 3 is a circuit diagram of one embodiment of the present invention.

Referring now to FIG. 3, one preferred implementation of the present invention now will be described. The transducer 1 has its inputs connected to the inverting input and the output of an operational amplifier A1, respectively. The non-inverting input of the amplifier A1 is connected through a resistor R1 to what is effectively a voltage of fixed amplitude, the polarity of which changes periodically, as will be described below. A substantially constant current flows through the resistor R1, so that the operational amplifier A1 may be thought of as an infinite impedance, constant current source. The non-inverting output of the amplifier A1 may also be thought of as connected to a fixed voltage, which will be described below.

The outputs of the transducer 1 are provided respectively to the inverting and non-inverting inputs of another operational amplifier A2 which is configured as an integrator, with a capacitor C1 connected between its output and its inverting input. With the foregoing connection, the transducer bridge 1 is effectively connected in the feedback circuit of operational amplifier A1, so that the operational amplifier A1 effectively acts as a constant current source.

There are a couple of reasons for connecting the transducer in this manner. First, in a technical note TN-002 provided by IC Sensors for giving directions for implementing their piezoresistive transducer, it is suggested that a constant current be supplied to the transducer 1. In this fashion the positive temperature coefficient of resistance of the transducer substantially cancels its negative temperature coefficient of pressure sensitivity.

A second reason for connecting the bridge in this way is that, as disclosed in the Huijsing et al. article, reversing the polarity of the current removes the effect of the offset voltage of A2 and its variation with temperature.

A resistor $R_{BB}$ connected between terminals $T_2$ and $T_3$ of the transducer 1 causes bridge unbalance. Thus, since the operational amplifier A2 is configured as an integrator, the extent to which the voltage at the terminal $T_2$ of the transducer 1 is more or less negative than that at the output at the terminal $T_4$ will cause the integrator to ramp up or down at a rate roughly set by $R_{BB}$ and modified by the output of the transducer. Specifically, the output will ramp up if the voltage at the $T_2$ is more negative than that at $T_4$, and will ramp down if the voltage at the $T_2$ is less negative than that at $T_4$.

The amplifier A3 has its non-inverting input connected to the output of the amplifier A2 through a resistor R2. The output of the amplifier A3 is connected in a positive feedback manner through a resistor R3, and also is provided to the resistor R1. The amplifier A3 operates as a Schmitt trigger. When the output of the integrator A2 exceeds a trigger threshold either positively or negatively, the output of the amplifier A3 will reverse, thus reversing all voltages applied to A1 and the transducer 1. This reversal is what causes any offset in the input of A2 to be opposite to the signal between $T_4$ and $T_2$ of the transducer 1, compared with the immediately proceeding polarity. The offset may change the sweep of the integrator A2 to make the upsweep shorter and the downsweep longer, but the total duration of that sweep will be independent of the amount of offset.

In FIG. 3, the operational amplifier A4 acts as a bias source, and is intended to supply voltage which is one-half the power supply voltage. A voltage divider of two equal resistors provides this supply voltage which is buffered by the amplifier A4 which acts as a voltage follower.

Figure 4:
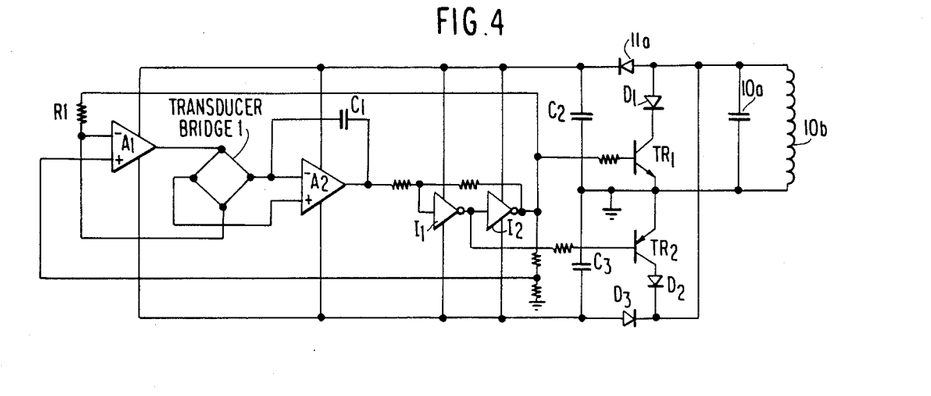
FIG. 4 is a circuit diagram of an alternative embodiment of the invention.

FIG. 4 shows an alternative implementation in which the amplifier A4 no longer is necessary. By adding a transistor TR1 and diodes D1, D2, D3 as well as capacitors C2, C3, the power supply voltage may be doubled. The diode D1 takes the positive peak value of the AC on the secondary coil and diode D3 takes the negative peak value of the same AC. The voltage between the cathode of D1 and the anode of D3 therefore is twice as large as the AC peak voltage, and the common terminal of the secondary coil is halfway between these two diode terminals.

Figure 5:
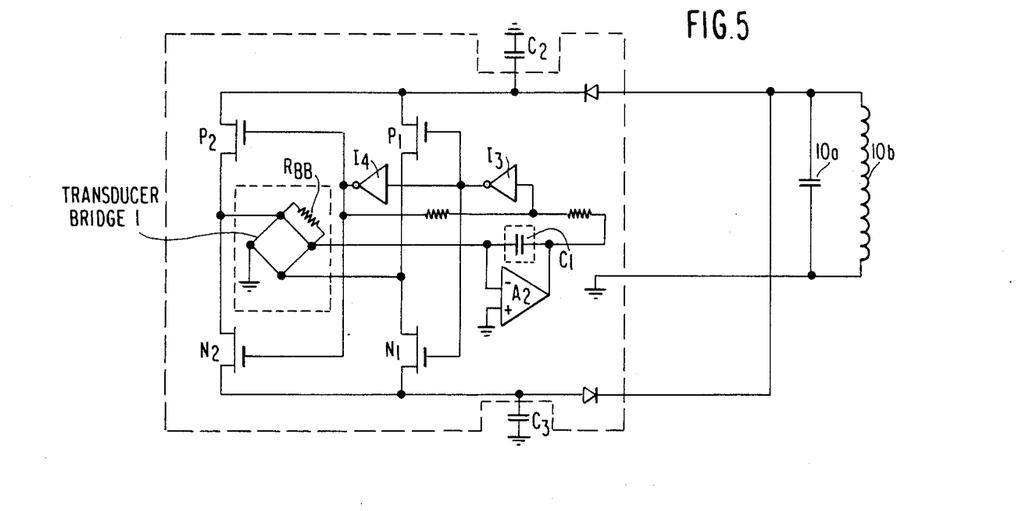
FIG. 5 is a circuit diagram of one way of implementing the circuitry of the present invention in integrated circuit form.

As in the circuitry of FIG. 3, voltage as applied to amplifier A1 and to the transducer bridge 1 are reversed, the inverters I1, I2 acting as the Schmitt trigger and providing the reversal function. The output of inverter I2 also turns the transistor TR1 on and off, and provides a switching signal which is transmitted from the secondary coil 10b to the primary coil 9. The transistor TR1, in series with the diode 11a, can only short circuit the secondary coil when its top terminal is positive. The transistor TR2, in series with the diode D3, serves the same purpose when the coils top terminal is negative FIG. 5 shows a possible implementation in integrated circuit form. The integrator, including amplifier A2 and capacitor C1 are shown, as are the secondary coil 10b and the tuning capacitor 10a. The capacitors C1, C2, and C3 are located offchip. Inverters I3, I4 control the gates of respective pairs P1, N1 and P2, N2 of P-channel and N-channel enhancement MOSFETs. The transducer bridge 1 is provided on a separate chip and has a bridge unbalancing resistor $R_{BB}$ associated with it.

Figure 6:
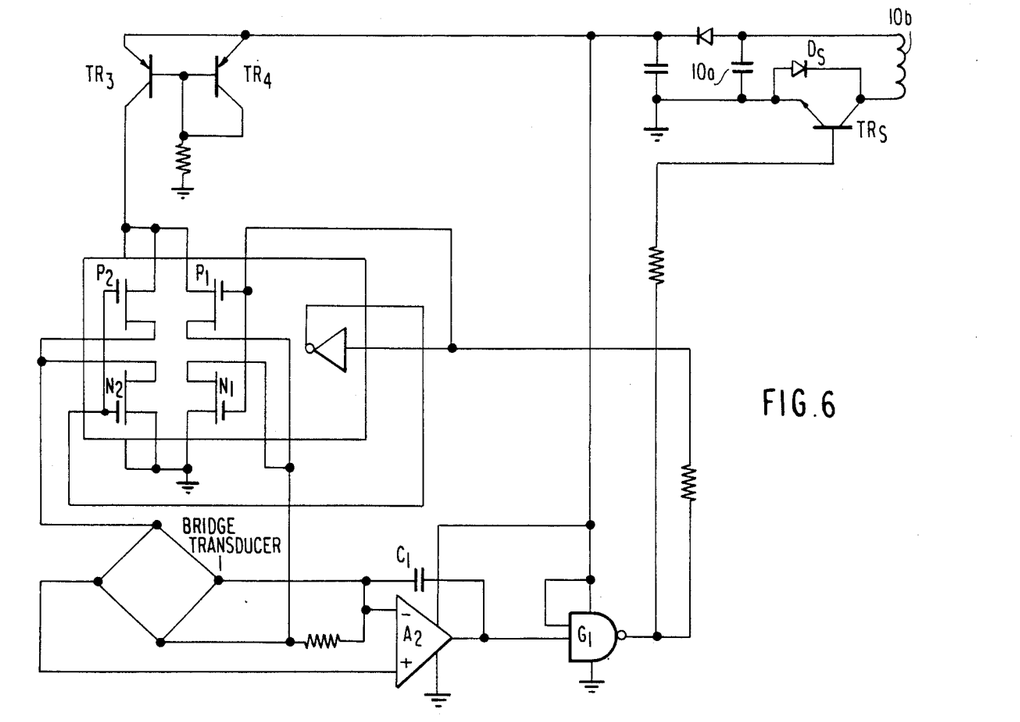
FIG. 6 is a circuit diagram of another possible integrated circuit implementation of the invention.

The circuits shown in FIGS. 3-5 involve the short-circuiting of the secondary coil 10b through the discharge of the capacitor 10a. An alternative embodiment is shown in FIG. 6, wherein the secondary coil is turned on and off in accordance with the operation of a transistor TRS. In this implementation the modulation of power absorption is simplified by merely opening the resonant circuit. The same sort of information may be transmitted to the primary coil 9 from the secondary coil 10b, but at lower power consumption. Normally, it might be considered difficult to "start" an electrical device which is not connected to its source of power to begin with. However, with the connection of the diode $D_S$ across the transistor $TR_S$, the diode retains enough of the power to enable the transmission process to be substantially continuous, without actually requiring the tuned circuit 10 to actually receive power continuously from the primary coil 9.

Another difference in the circuitry of FIG. 6 is the use of a current mirror, comprising in this embodiment two PNP transistors $TR_3$, $TR_4$. The same P-channel and N-channel enhancement MOSFETs are shown in FIG. 6 as in FIG. 5. One chip suitable for providing the appropriate MOSFETs is an RCA CMOS chip. Model CD4007UB. An exemplary bridge transducer 1 may be the IC Sensors Model 10A. A gate G1, which combines internal hysteresis, as for example in the RCA CMOS chip CD 4093B, with a level shifting function, as for example in the RCA CMOS chip CD 40109B, performs the Schmitt trigger function of the amplifier A3 of FIG. 3.

As compared with FIG. 4, the gate G1 has an output which controls the operation of the switching transistor $TR_S$. In contrast, the output of the second inverter I2 in FIG. 4 opens and closes the switching transistor TR1 which is in shunt, or parallel with the secondary coil, and therefore must absorb all of the power being sent to that coil. Another difference between the structure of FIG. 6 and that of FIG. 5 and FIG. 4 is in the function of the current mirror comprising transistors TR3 and TR4 as the constant current source.

In each of the diagrams of FIGS. 4-6, in certain applications. it is desired that the bridge transducer output be substantially independent of temperature. The amplifier A2 desirably operates to make this voltage zero by providing feedback through the capacitor $C_1$, and it is the current out of the bridge that is sensed. That current is the ratio of the temperature-insensitive bridge output voltage to the temperature-sensitive bridge resistance, and thus is dependent on temperature. However, by adding a suitable resistance between the bridge output and the inverting input of amplifier $A_2$, the bridge resistance temperature coefficient may be compensated for with substantial exactness.

In accordance with each of the described embodiments, the circuit of the present invention provides reliable temperature compensated pressure indication to chassis-mounted circuitry. Nowadays, many vehicles. particularly those at the upper end of the price spectrum incorporate a number of microcomputers which perform various functions, including displaying of information. There is a great deal of excess computing power available, of which the present invention can take advantage. One or more of the various on-board processors may take the pressure information and translate it into a pressure value which is displayed for a vehicle operator. The value may be displayed numerically, on command, or may be displayed automatically, as a warning indication. for example by causing a light to flash on the console. A different light could be provided for each wheel, including the spare.

While the present invention can take advantage of the excess computing power available in today's vehicles, it should be kept in mind that, with continuing improvements in integrated circuit technology, more and more of the processing functions may be performed by the wheel-mounted circuitry itself, as opposed to being performed by the microcomputer circuitry contained in the vehicle.

One area of application of the technique of the present invention involves the storage of pressure information in a memory. For example, tire pressure could be sampled at regular intervals, and a record of the readings at these intervals stored in memory as a pressure history. This would enable monitoring of a rate of change of pressure, and thus enable detection of a tire leak, with an associated warning to an operator, in advance of a potentially dangerous situation. Knowing the rate of decrease of pressure also would enable suggesting to the motorist that the vehicle should be stopped by a certain time in order to correct the situation. Calculation of rate of change of pressure could be done by a central computer within the automobile, or as mentioned above, might be carried out in more advanced circuitry within the tire itself.

Figure 7:
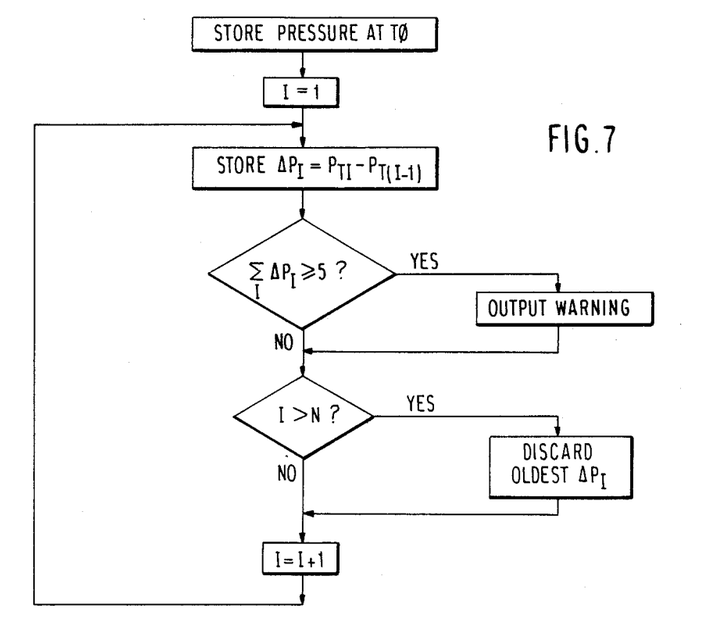
FIG. 7 is a flow chart describing one aspect of operation of the present invention.

Retaining a tire pressure history also would be useful to a tire manufacturer, in determining how a tire has been treated when a motorist seeks to enforce an automobile warranty. The amount of data to be stored could be minimized by recording only significant changes in pressure. In this way, data would not be entered in a memory when tire pressure remains within prescribed limits. However, if there is a change which is outside the prescribed limits (for example, ±5 psi) the data could be entered along with the time at which the data was observed. The vehicle's processor could be linked to an external printer to provide a history printout. A flow chart describing the operation of this pressure history approach is shown in FIG. 7.

Figure 8:
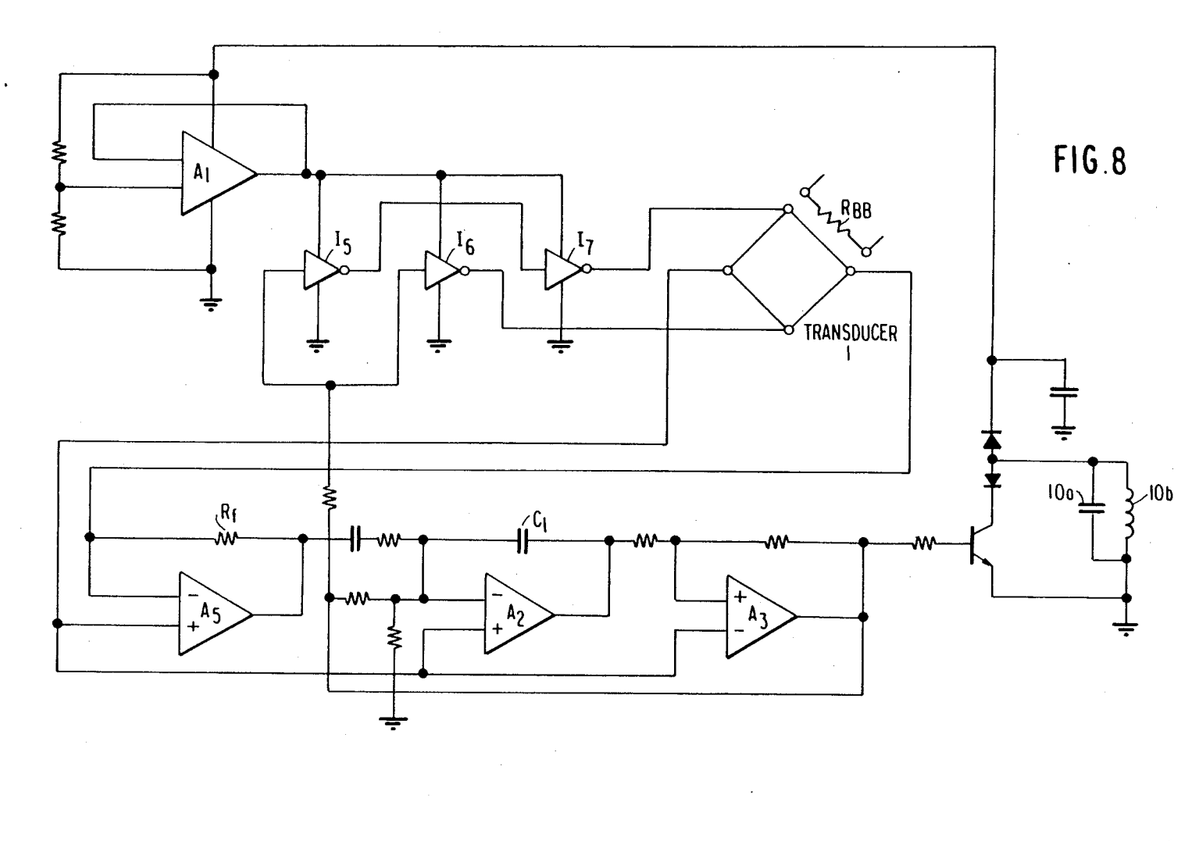
FIG. 8 is a circuit diagram of another alternative embodiment of the invention.

Another embodiment of the invention is shown in FIG. 8. In this embodiment, ambient temperature outside the tire is compensated for by providing a constant voltage, rather than a constant current, to the bridge transducer. An output of amplifier $A_1$ provides power to a series of inverters $I_5$–$I_7$ which reverse the voltage applied to the bridge transducer 1 in response to a square wave which is produced by a Schmitt trigger (e.g. amplifier $A_3$ and associated resistances) and an integrator (e.g. amplifier $A_2$ and associated capacitance, including capacitor $C_1$). If necessary, the scale factor of the bridge is normalized with a feedback resistor $R_f$ which is selected by reference to the sensor's resistance value. As the applied bridge voltage is reversed continually,. the output voltage of amplifier $A_5$ also is a square wave, and provides additional input to the integrator, via a suitably selected coupling capacitor and resistor. The coupling capacitor blocks any offsets in the amplifier $A_5$ from the integrator.

Figure 9:
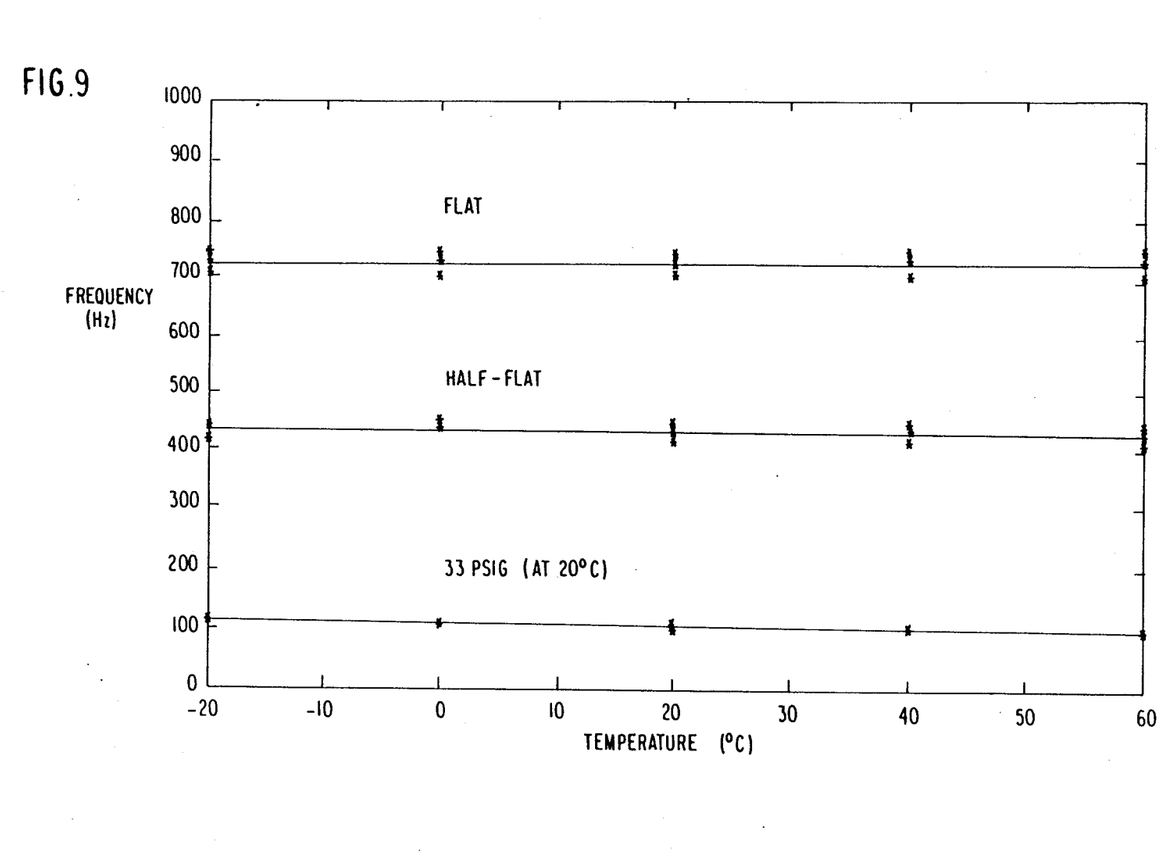
FIG. 9 is a graph depicting the nature of the information provided to a user by the embodiment of FIG. 8.

The Schmitt trigger $A_3$ acts, similarly as in the embodiment of FIG. 3, to short circuit the secondary coil through which power is received, to affect operation of the primary coil which transmits that power. The output of the Schmitt trigger provides an indication of what the tire pressure would be if the ambient temperature were constant (e.g. 20° C.). The output thus is more meaningful to a user, for the following reason. In the case of the embodiments of FIGS. 4–6, assuming a tire is filled to 33 psi at 20° C., if the tire were flat, the readout from those earlier-described embodiments would be 0 psi at 20° C., but could be −7 psi at 20° C. and +7 psi at 60° C. These indications would not be very meaningful. If a tire is flat, such should be shown. Accordingly, the embodiment of FIG. 9 provides an output of 0 psi when a tire is flat. Correspondingly, when a tire is full or substantially full, the readout provided by the embodiment of FIG. 8 will take into account any deviations of ambient temperature from a predetermined constant value, and will tell the user what the pressure would be if the ambient temperature were equal to that predetermined value.

FIG. 9 shows the effects of the embodiment of FIG. 8. As can be seen, the output frequency remains substantially constant as a function of ambient temperature. The frequency varies as a function of pressure, so that the frequency of short circuiting of the secondary coil corresponds to detected pressure.

While the invention has been described in detail above with reference to several specific embodiments, various modifications within the spirit of the present invention will be evident to ordinarily skilled artisans. Thus, the invention should be considered as limited only by the scope of the appended claims, which follow immediately.

What is claimed is:

1. In a vehicle comprising at least one wheel and a chassis to which said at least one Wheel is rotatably attached, a system for communicating temperature-compensated tire pressure from said at least one wheel to said chassis, said system comprising:

first energy transmitting means (9), mounted on said chassis, for transmitting first energy of a first predetermined frequency;

first energy receiving means (10), mounted on said at least one wheel, for receiving said first energy;

tire pressure signal generating means (1,2), mounted on said at least one wheel and responsive to pressure of a tire mounted on said at least one wheel, for generating a tire pressure signal;

constant current applying means (A1) for applying a constant current to said tire pressure signal generating means;

voltage polarity reversing means (A2, A3) for reversing polarity of voltage applied to said tire pressure signal generating means;

wherein said tire pressure signal generating means comprises a piezoresistive bridge, said constant current applying means and said voltage polarity reversing means enabling compensation for temperature drift, to produce a temperature-compensated tire pressure signal; and wherein said temperature-compensated tire pressure signal is transmitted by said first energy receiving means to said first energy transmitting means, and alters operation of said first energy transmitting means, so as to communicate said signal from said at least one wheel to said chassis;

said system further comprising indicating means (5) for processing said temperature-compensated tire pressure signal to provide information indicative of said temperature-compensated tire pressure within said vehicle.

2. A system as claimed in claim 1, wherein said vehicle comprises a plurality of wheels including a spare, and said first energy receiving means, said tire pressure signal generating means, said constant current applying means, and said voltage polarity reversing means are mounted on each of said wheels, each of said first energy receiving means transmitting a respective said temperature-compensated tire pressure signal to said chassis for communication to a central location on said chassis for processing by said indicating means.

3. A system as claimed in claim 1, wherein said first energy transmitting means comprises a primary coil, and said first energy receiving means comprises a tuned circuit, including a secondary coil (10b) and a capacitor (10a) connected across said secondary coil, and wherein said primary coil is excited at said predetermined frequency in response to connection of an ignition switch.

4. A system as claimed in claim 3, further comprising switching means (TR2) for alternately opening and closing said secondary coil to alter operation of said primary coil.

5. A system as claimed in claim 3, further comprising secondary coil short circuiting means for short circuiting said secondary coil to alter operation of said primary coil.

6. A system as claimed in claim 3, further comprising secondary coil open circuiting means (TR$_S$, D$_S$) for open circuiting said secondary coil to alter operation of said primary coil.

7. A system as claimed in claim 6, wherein said secondary coil open circuiting means comprises a transistor connected to one end of said secondary coil and a diode connected across a collector and an emitter of said transistor, a base of said transistor being connected to an output of said Schmitt trigger means.

8. A system as claimed in claim 1, wherein said voltage polarity reversing means comprises an integrator including a first operational amplifier (A2) and a capacitor (C1) connected in negative feedback manner, and Schmitt trigger means (A3, R2, R3), and wherein said constant current source applying means comprises a second operational amplifier (A1) connected to said Schmitt trigger means, wherein said piezoresistive bridge is connected in a feedback circuit with said voltage polarity reversing means.

9. A system as claimed in claim 8, wherein said voltage polarity reversing means further comprises inverting means (I$_5$, I$_6$, I$_7$) connected between an output of said constant current source applying means and said piezoresistive bridge, for providing a constant voltage to said piezoresistive bridge.

10. A system as claimed in claim 1, wherein said constant current source applying means, comprises a current mirror circuit (TR3, TR4).

11. A system as claimed in claim 1, wherein said voltage polarity reversing means comprises a plurality of N-channel and P-channel enhancement MOSFETs.

12. A system as claimed in claim 1, wherein said constant current source applying means, said voltage polarity reversing means, and said piezoresistive bridge are integrated in a monolithic IC chip.

13. A system as claimed in claim 1, further comprising storage means for storing a plurality of said temperature-compensated tire pressure signal at spaced intervals, to provide a tire pressure history.

14. A system as claimed in claim 1, wherein said voltage polarity reversing means comprises an integrator including a first operational amplifier (A2) and a capacitor (C1) connected in negative feedback manner, Schmitt trigger means (A3, R2, R3), and inverting means (I$_5$, I$_6$, I$_7$) connected between an output of said constant current source applying means and said piezoresistive bridge, for providing a constant voltage to said piezoresistive bridge, and wherein said constant current source applying means comprises a second operational amplifier (A1) connected to said Schmitt trigger means, wherein said piezoresistive bridge is connected in a feedback circuit with said voltage polarity reversing means.

15. In a vehicle comprising at least one Wheel and a chassis to which said at least one wheel is rotatably attached, a tire-pressure sensor for monitoring pressure of a tire mounted on said at least one wheel and for outputting a temperature-compensated tire pressure signal from said at least one wheel to said chassis, said sensor comprising:
   first energy transmitting means (9), mounted on said chassis, for transmitting first energy of a first predetermined frequency;
   first energy receiving means (10), mounted on said at least one wheel, for receiving said first energy;
   tire pressure signal generating means (1,2); mounted on said at least one wheel and responsive to pressure of a tire mounted on said at least one wheel, for generating a tire pressure signal;
   voltage polarity reversing means (A2, A3) for reversing polarity of voltage applied to said tire pressure signal generating means, wherein said voltage polarity reversing means comprises an integrator including a first operational amplifier (A2) and a capacitor (C1) connected in negative feedback manner, and Schmitt trigger means (A3, R2, R3);
   constant current applying means (A1) for applying a constant current to said tire pressure signal generating means, wherein said constant current source applying means comprises a second operational amplifier (A1) connected to said Schmitt trigger means;
   wherein said tire pressure signal generating means comprises a piezoresistive bridge, said piezoresistive bridge being connected in a feedback circuit with said voltage polarity reversing means, said constant current applying means and said voltage polarity reversing means enabling compensation for temperature drift, to produce a temperature-compensated tire pressure signal; and
   wherein said temperature-compensated tire pressure signal is transmitted by said first energy receiving means to said first energy transmitting means, and alters operation of said first energy transmitting means, so as to communicate said signal from said at least one wheel to said chassis.

16. A sensor as claimed in claim 15, wherein said vehicle comprises a plurality of Wheels including a spare, and said first energy receiving means, said tire pressure signal generating means, said constant current applying means, and said voltage polarity reversing means are mounted on each of said wheels, each of said first energy receiving means transmitting a respective said temperature-compensated tire pressure signal to said chassis for communication to a central location on said chassis.

17. A system as claimed in claim 15, wherein said first energy transmitting means comprises a primary coil, and said first energy receiving means comprises a tuned circuit, including a secondary coil (10b) and a capacitor (10a) connected across said secondary coil, and wherein said primary coil is excited at said predetermined frequency in response to connection of an ignition switch.

18. A system as claimed in claim 17, further comprising switching means (TR2) for alternately opening and closing said secondary coil to alter operation of said primary coil.

19. A system as claimed in claim 17, further comprising secondary coil short circuiting means for short circuiting said secondary coil to alter operation of said primary coil.

20. A system as claimed in claim 17, further comprising secondary coil open circuiting means (TR$_S$, D$_S$) for open circuiting said secondary coil to alter operation of said primary coil.

21. A system as claimed in claim 20, wherein said secondary coil open circuiting means comprises a transistor connected to one end of said secondary coil and a diode connected across a collector and an emitter of said transistor, a base of said transistor being connected to an output of said Schmitt trigger means.

22. A system as claimed in claim 15, wherein said constant current source applying means comprises a current mirror circuit (TR3, TR4).

23. A system as claimed in claim 15, wherein said voltage polarity reversing means further comprises inverting means (I$_5$, I$_6$, I$_7$) connected between an output of said constant current source applying means and said piezoresistive bridge, for providing a constant voltage to said piezoresistive bridge.

24. A system as claimed in claim 15, wherein said constant current source applying means, said voltage polarity reversing means, and said piezoresistive bridge are integrated in a monolithic IC chip.

25. In a vehicle comprising at least one wheel and a chassis to which said at least one wheel is rotatably attached, a tire-pressure sensor for monitoring pressure of a tire mounted on said at least one wheel and for outputting a temperature-compensated tire pressure signal from said at least one wheel to said chassis, said sensor comprising:

first energy transmitting means (9), mounted on said chassis, for transmitting first energy of a first predetermined frequency;

first energy receiving means (10), mounted on said at least one wheel, for receiving said first energy;

tire pressure signal generating means (1,2), mounted on said at least one wheel and responsive to pressure of a tire mounted on said at least one wheel, for generating a tire pressure signal, said tire pressure signal generating means comprising a piezoresistive bridge;

voltage polarity reversing means (A2, A3) for reversing polarity of voltage applied to said tire pressure signal generating means, wherein said voltage polarity reversing means comprises an integrator including a first operational amplifier (A2) and a capacitor (C1) connected in negative feedback manner, and Schmitt trigger means (A3, R2, R3);

constant current applying means (A1) for applying a constant current to said tire pressure signal generating means, wherein said constant current source applying means comprises a second operational amplifier (A1) connected to said Schmitt trigger means, wherein said voltage polarity reversing means further comprises inverting means (I$_5$, I$_6$, I$_7$) connected between an output of said constant current source applying means and said piezoresistive bridge, for providing a constant voltage to said piezoresistive bridge;

wherein said piezoresistive bridge is connected in a feedback circuit with said voltage polarity reversing means, said constant current applying means and said voltage polarity reversing means enabling compensation for temperature drift, to produce a temperature-compensated tire pressure signal; and wherein said temperature-compensated tire pressure signal is transmitted by said first energy receiving means to said first energy transmitting means, and alters operation of said first energy transmitting means, so as to communicate said signal from said at least one wheel to said chassis.

* * * * *